Figure 1:
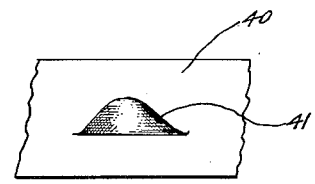

Aug. 17, 1943.     W. C. CALVERT     2,327,170
METHOD OF MAKING RUBBER HYDROCHLORIDE SHEETS
AND WRAPPING ARTICLES THEREIN
Original Filed July 25, 1933

Inventor
William C. Calvert

By    R. H. Waters
Attorney

Patented Aug. 17, 1943

2,327,170

UNITED STATES PATENT OFFICE 2,327,170

METHOD OF MAKING RUBBER HYDROCHLORIDE SHEETS AND WRAPPING ARTICLES THEREIN

William C. Calvert, Gary, Ind., assignor to Wingfoot Corporation, Wilmington, Del., a corporation of Delaware Continuation of application Serial No. 194,586, March 8, 1938, which is a division of application Serial No. 682,116, July 25, 1933. This application October 14, 1941, Serial No. 414,937

3 Claims. (Cl. 18—56)

This invention relates to improvements in methods of making rubber hydrochloride sheets and wrapping articles therein.

This invention contemplates the wrapping of articles to form packages and the transformation of perfectly flat sheets of a rubber hydrochloride such as a partially saturated rubber hydrochloride into sheets having areas stretched to conform to irregular contours of the article packaged.

The material which is used according to the preferred embodiment of this invention is a rubber derivative formed by partially saturating rubber with hydrogen chloride. Rubber which is 85 to 90% saturated with hydrogen chloride forms a non-tacky transparent sheet which is resistant to acids, alkalies, oils and moisture and which is slightly extensible. The rubber hydrochloride may be formed in the following way.

Twenty pounds of plasticized pale crepe rubber are dissolved in 313 pounds of benzene, giving a rubber cement of approximately 6% concentration. The cement is cooled to about 10° C., and hydrogen chloride gas is introduced into it while it is vigorously agitated. After about six hours the increase in weight of the composition due to the introduction of hydrogen chloride gas should be approximately 11.6 pounds which corresponds to a slight excess of available hydrogen chloride over that theoretically required by the empirical formula $(C_5H_9Cl)_x$. The introduction of hydrogen chloride is then discontinued, and the reaction of the hydrogen chloride with the cement is allowed to progress until a washed and dried sample indicates that 29 to 30.5% of chlorine is combined with the rubber. Generally the time required is about 20 hours. The reaction mixture is then steam distilled to remove the benzene and the excess hydrogen chloride. The resulting mass is broken up on a rubber washer and washed thoroughly and dried in a vacuum at approximately 160° F. The rubber hydrochloride is then dissolved in chloroform or dichlor ethylene in the ratio of about one part rubber hydrochloride to twenty parts of the solvent. The aging properties of the film may be improved by adding a small amount of an antioxidant. Hexamethylene tetramine and methylene amino acetonitrile are effective for this purpose. Where a colorless transparent film is desired it is advantageous to use 3% of ditetrahydro furfuryl amine or dicyclohexyl amine with 1½% of hexamethylene tetramine. The antioxidant is dissolved in the solvent with the washed reaction mass.

The invention will be further explained in connection with the drawing in which Fig. 1 shows a sheet with a protuberance therein and Fig. 2 indicates in section how a film may be stretched.

In making a film for wrapping purposes from a rubber hydrochloride solution such as described the material may be run onto a continuous belt in such an amount as to produce a film about 1/1000 of an inch thick after the solvent has been evaporated. Heat is applied and the solvent is evaporated slowly without boiling. A clear transparent film results. Irregularities in the under surface of the film are produced by using a belt having complementary irregularities in its surface. If a certain area of the film is to be depressed, that portion of the belt on which this area of the film is formed will be raised, or a form of suitable shape may be fastened to the belt. If a portion of the film is to be raised to produce an embossed effect, the portion of the belt on which it is formed will be depressed. If a very thin film is produced, the variations in thickness are preferably kept at a minimum to prevent distortion of the film in drying. If a thicker sheet is to be formed somewhat greater variations in thickness are possible without causing distortion of the sheet. The raised or depressed portions may constitute a trade-mark or other design which may be merely for decorative purposes or they may comprise printed matter or may be used for any other purpose.

Instead of forming films of irregular thickness in this way, a perfectly uniform sheet of the rubber hydrochloride may first be formed on a belt having a perfectly smooth surface, and this may be after-treated to produce the effects desired. The rubber hydrochloride is thermoplastic and while still warm from the process of manufacture or by heating, if necessary, the surface may be altered as desired and certain alterations in the surface may be made at room temperature by the proper application of pressure. The unsaturated hydrochloride produced in the manner above described is slightly extensible and can be marked by stamping without destroying its texture and waterproofing properties. Although stamping at room temperature produces some effect on a sheet or film, it is preferable to stamp in a press heated to 80–85° C. for example, or to first heat the sheet and then stamp it. Where depressed or raised areas of large dimensions are to be formed, the sheet should be heated until it softens somewhat.

It often happens that for wrapping articles of irregular shape or for enclosing them in a protective layer which comprises a part of the article itself, or for covering or protecting an inner constituent of a fabricated article a sheet which is not altogether flat is preferred to a perfectly flat sheet. For example, in wrapping a perfectly square article on which is a protruding handle, a sheet with a protuberance shaped to fit the handle is preferable to a perfectly flat sheet. Fig. 1 shows film 40 on which a protuberance 41 has been formed which is of predetermined shape. Thimble-like or finger-like protuberances or protuberances of larger area and varying depth may be formed by stretching a limited area of a sheet of the rubber hydrochloride. Where a considerable amount of stretching is required, it is preferable to apply heat before or during the stretching. Such stretching may be accomplished by the gradual application of pressure between plates or rolls or in apparatus particularly designed for the purpose in which the stretching may be effected by the movement of one or more members after the area surrounding the part to be stretched has been tightly clamped in place. Stretching orients the rubber hydrochloride film and makes it thinner. The protuberance may be shaped in a heated mold if this is desired.

Figure 2:
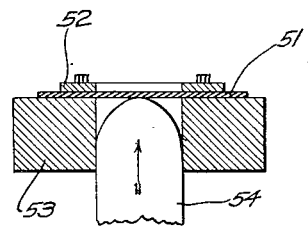

Fig. 2 illustrates apparatus for stretching as above described. The film 51 is clamped between the clamp 52 and the base plate 53 of the stretching machine. The plunger 54 which may be any shape moving up against the film stretches it. If the film moves gradually as described, it is unnecessary to heat the film.

If the sheet is to be stretched to any considerable extent, this may be advantageously accomplished by treatment of the sheet during its formation, before all of the solvent has been evaporated from it. For instance, in the manufacture of the rubber hydrochloride film from a solution of chloroform, after evaporating most of the solvent, for example when the solvent content has been reduced to about 10%, certain areas may be stretched to form desired protuberances, particularly if the stretching is effected while the film is still warm. The balance of the solvent may then be evaporated.

If considerable stretching is required to form the desired protuberance, the portion of the sheet which is to be stretched may be made somewhat thicker than the surrounding portion by forming it on a belt with depressed areas to give the desired thickness at the required portions of the film.

Although the invention relates more particularly to the manufacture of transparent film it includes sheets of greater thickness and sheets which are not transparent. Colored sheets may be formed by the addition of dyestuffs.

A sheet of rubber hydrochloride may be modified by pressing it between plates, at least one of which has an irregular surface, while heating to the softening point.

This application is a continuation of my copending application Serial No. 194,586 filed March 8, 1938, which is a division of my application Serial No. 682,116 filed July 25, 1933. This application is also a continuation of my co-pending application Serial No. 133,172 filed March 26, 1937.

What I claim is:

1. The method of producing a rubber hydrochloride film of irregular surface which comprises applying a solution thereof to a belt with depressed areas, allowing the solvent to evaporate to give a film, restricted areas of which formed on the depressed areas have a greater thickness than the surrounding areas, and applying pressure to the areas of greater thickness to stretch them.

2. The method of wrapping an article in a film composed essentially of a rubber hydrochloride to form a package therefrom which comprises heating at least a portion of the sheet to increase its plasticity and stretching at least a portion of the sheet to make it fit the article.

3. In the method of wrapping an object with a rubber hydrochloride film to form a package, the steps of providing a blank of the film of an area substantially less than the surface of the object to be covered, heating the film to increase the stretchability of its central portion, and forming the film to fit the object.

WILLIAM C. CALVERT.